Feb. 11, 1969 G. F. WEISENBACH 3,426,463
TIRE DISPLAY APPLIANCES
Filed Feb. 9, 1967
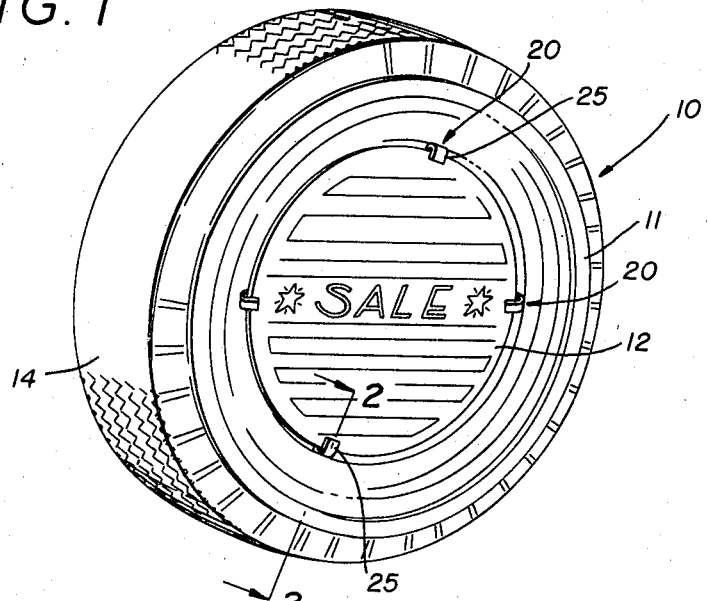
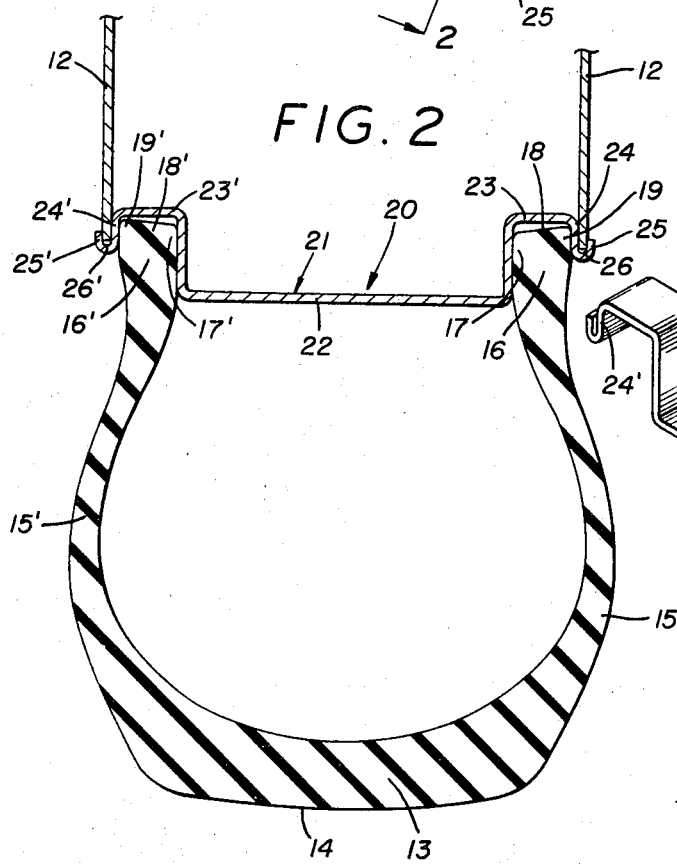
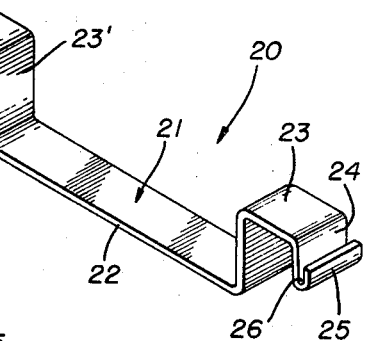
INVENTOR.
GEORGE F. WEISENBACH
BY Hamilton & Cook
ATTORNEYS INVENTOR.
GEORGE F. WEISENBACH
BY Hamilton & Cook
ATTORNEYS

United States Patent Office 3,426,463
Patented Feb. 11, 1969

3,426,463
TIRE DISPLAY APPLIANCES
George F. Weisenbach, Akron, Ohio
Continuation-in-part of application Ser. No. 472,988, July 19, 1965. This application Feb. 9, 1967, Ser. No. 623,170
U.S. Cl. 40—125                          3 Claims
Int. Cl. G09f 7/18; B60c 25/14

ABSTRACT OF THE DISCLOSURE

Article for attaching display signs to tires. The article spans the beads of a tire at spaced intervals, presents the tire in an appearance of actual use, and carries advertising or name cards.

*Cross-reference to related application*

This application is a continuation-in-part of prior application Ser. No. 472,988, filed July 19, 1965, now abandoned.

*Summary of the invention*

The present invention relates to an article or display appliance for a tire. A tire has a crowned tread, sidewalls, bead heel and toe portions. The article includes a yoke member having lateral length sufficient to spread the tire beads. At each end of the yoke member are leg members. Each leg member is specially shaped or contoured so as to frictionally adhere to or abut the inner heel portion of a tire bead, bridge the radially inner surface of a tire bead and frictionally adhere to or abut the outer toe portion of a tire bead. The spreading of the beads by the yoke member and the engagement of the beads by the leg members flexes and distends the tire sidewalls and flattens the crowned tread, thereby simulating inflation of the tire. At least one leg member has a re-entrant flange, radially outward of a portion abutting the outer toe of a tire bead, defining a clip notch for insertion and retention of a card or display for advertising the tire as visually presented in a simulated inflated condition.

*The drawings*

FIG. 1 is a perspective view showing a tire, display appliances and an advertising card, according to the invention;

FIG. 2 is a sectional view, taken substantially as indicated by line 2—2 on FIG. 1, showing a tire display appliance, according to the invention, made of metal;

FIG. 3 is an isometric view of the tire display appliance of FIG. 2;

*Description*

Figure 4:
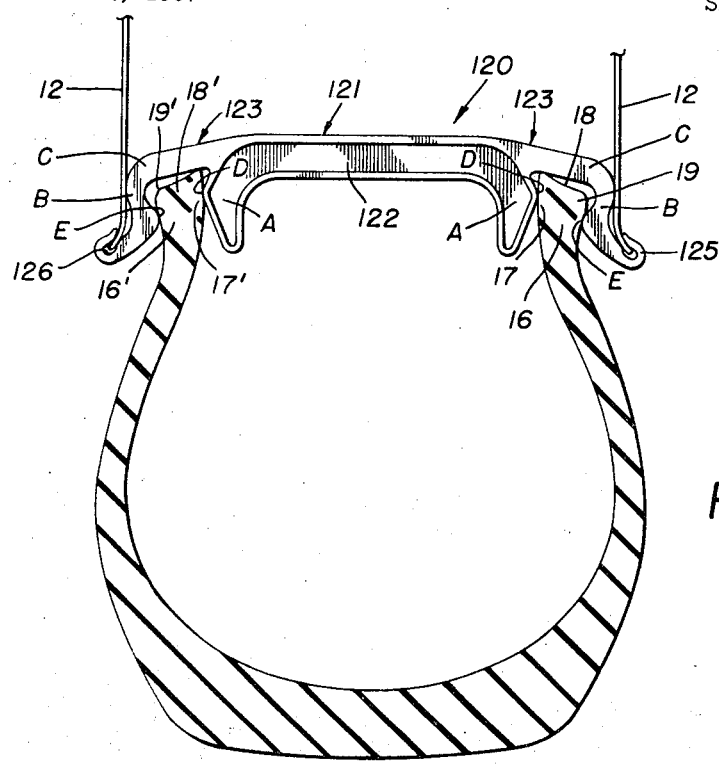
FIG. 4 is another sectional view, similar to FIG. 2, showing a tire display appliance, according to the invention, made of plastic; and, FIG. 5 is an isometric view of the tire display appliance of FIG. 4.

The present invention relates generally to a combination or arrangement for displaying and advertising new and retread vehicle tires in retail outlets, showrooms, and the like. More particularly, the invention relates to appliances or devices for thus displaying the tires.

Tires are generally stored in plants or warehouses in palletized stacks, and are frequently transported in bulk in freight cars and vehicles by compacting or lacing them into random interrelation to save space. Thus, when the tires reach their ultimate destination at the retail outlet or service station, they are often distored and deformed so that problems are presented in arranging an effective product display.

Furthermore, the resilient character of the tire bead and sidewall portions tends to produce an inwardly biasing circumferential spring effect when the tire is not inflated on a rim. This spring effect is transmitted to the tread, creating a pronounced rounding or convex distension of the tread crown. This deformation or rounding of the tread crown, of course, represents an abnormal and objectionable appearance for a tire from the standpoint that it detracts from realism and the effectiveness of the consumer appeal of the product display.

It has also been found that, in order that the tire display be esthetically unitary and attractive, the center opening through the tire beads should be covered by an ornamental wheel cover or a decorative advertising escutcheon or circular card.

Heretofore, tire display device concepts have not taken into account the first-mentioned problem of tread crown rounding. Instead, in a few isolated instances, retailers have attempted to alleviate this problem by inserting pre-cut pieces of wood between the beads. However, owing to the relatively wide range of variation in standard lateral bead spacing dimensions, such methods have proved unsatisfactory due to the time, expense, and inconvenience attendant to pre-cutting the wooden blocks.

Moreover, prior art tire center card holding devices have involved expensive or complex multiple-part constructions which were not adapted to universal use in varying sizes of tires. Furthermore, such devices have required access to the interior of the tire to effect mounting of the display device. Hence, it has been inconvenient and difficult to cover both sides of the tire center opening to provide a symmetrical product display.

Still other prior art tire center inserts have consisted of laminated cardboard constructions which have been expensive in that they are not reusable for new advertising subject matter.

Accordingly, it is a principal object of the present invention to provide an improved tire display combination.

It is a further object of the invention to provide inexpensive tire display appliances which afford convenience of use.

It is a still further object of the invention to furnish a universal tire display appliance adapted to use in a variety of tire sizes.

It is another object of the invention to provide a tire display appliance, composed of elastomeric material, plastic, or the like, which may be flexed to accommodate a varying range of lateral spacing and thickness dimensions for tire beads of varying sizes of tires.

It is yet another object of the invention to provide an inexpensive universal unitary tire display appliance having integral bead spreader means and advertising escutcheon retaining means.

Referring to FIG. 1, a tire display arrangement 10 as illustrated may comprise a new or retread vehicle tire 11 with advertising escutcheons 12 covering the front and back openings through the center of the tire and retained by a plurality of novel tire display appliances 20, preferably four in number.

The escutcheons 12 may be circular cardboard tire center cards (as shown), ornamental chromium wheel covers, shield-shape cards, or advertising or decorative displays of any of a variety of shapes and geometric configurations, so long as the escutcheon 12 is suitably adapted along its bordering peripheries for retention by the tire display appliances 20.

Referring to FIG. 2, a tire 11 generally comprises a tread portion 13 having a radially exterior circumferentially continuous tread crown surface 14. The tread 13 integrally merges into axially opposing sidewall portions 15 terminating at radially inner bead portions 16 adapted for mounting on a suitable vehicle rim (not shown). Each bead portion 16 has an axially inner portion known in the tire art as the bead heel region 17, a radially innermost portion 18 defining a circular opening axially through the center of the tire 11, and an axially outer portion designated in the art as the bead toe region 19.

In FIGURES 2 and 3 the primed numbers designate elements in the left portion of each figure which correspond to and are the same as those designated by the respective unprimed number in the right portion of each figure.

The tire display appliance 20 is disposed between axially opposing points of the beads 16 and 16', in spanning relation, and retain the opposing advertising escutcheons 12 and to spread the beads 16 laterally. The spreading forces are transmitted through the tire sidewalls 15 to the tread 13, thereby effecting a lateral flattening of the tread crown surface 14 which simulates the shape assumed by the tread surface when inflated on a rim and in service.

The tire display appliance 20 is formed as an integral unitary member as by die-forming metal stock.

The appliance 20 comprises a yoke portion 21, bridging and embracing opposing points of tire beads 16 and including an axially directed lateral bead spanning bar member portion 22 integrally joining at each of its ends with a radially inwardly directed, generally L-shaped leg portion 23 oriented substantially at a right angle thereto. Each leg portion 23 is adapted to abut, and exert an axially outwardly directed force upon, the bead heel region 17 of the respective bead 16 and to overlap the radially inner bead periphery 18.

Each L-shaped leg portion 23 is integrally joined at its outer end with a generally radially outwardly directed bead clamping portion 24, which is adapted to engage over the bead toe region 19. The bead clamping portion 24 terminates in a re-entrant clip flange portion 25 which defines a cove notch 26 into which a portion of the peripheral border of the advertising escutcheon may be conveniently inserted for retention in proper position on at least one side of the central opening through the tire 11.

Referring to FIG. 4, the alternative form of a tire display appliance 120, made of a plastic such as nylon or polypropylene, is also disposed between axially opposing points of the beads 16 and 16', in spanning relation, to retain the opposing advertising escutcheons 12 and to spread the beads 16 laterally.

The appliance 120 comprises a yoke member 121 having an axially directed lateral bead spanning member portion 122 integrally joining at each of its ends with a radially directed leg member 123. Each leg member 123 is specially shaped or contoured so as to frictionally adhere to the inner heel portion of a tire bead, bridge the radially inner surface of a tire bead and frictionally adhere to the outer toe portion of a tire bead.

Figure 5:
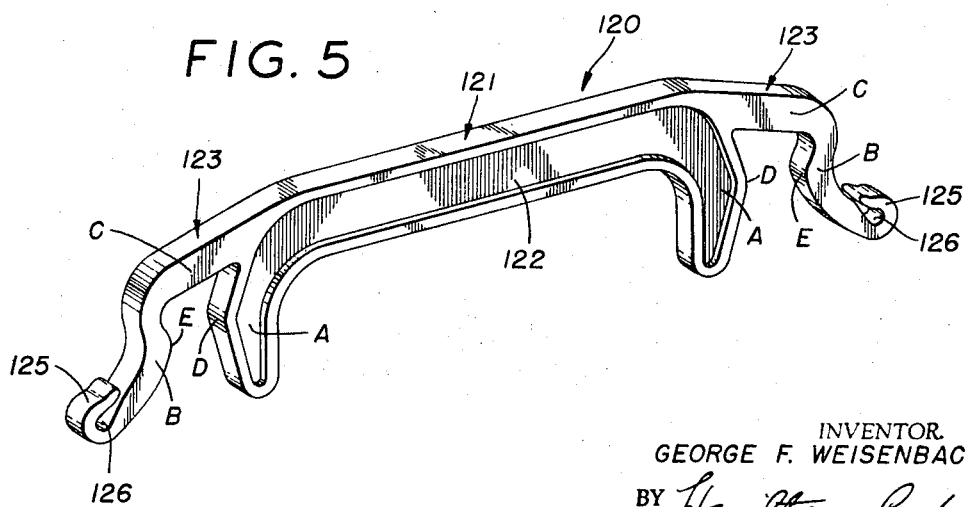

Referring also to FIG. 5, each leg member 123 is in the form of a tire bead receiving chuck with a radially outwardly directed face plate A and an opposed radially outwardly directed jaw flange B spaced axially outwardly of the face plate A by a bridge link C. The face plate and jaw flange are each provided with axially opposed nubs D and E, respectively. Radially inwardly of the nubs D and E, the bight formed by the opposed face plate A and jaw flange B is coved to approximate the cross-sectional profile of a typical or usual tire bead so that when the appliances 120 are used with a tire on display the leg members 123 will abut or engage the tire beads.

As shown, the radially outer end of a leg member jaw flange B terminates in a re-entrant clip flange portion 125 which defines a cove notch 126 into which a portion of the peripheral border of the advertising escutcheon may be conveniently inserted for retention in proper position on at least one side of the central opening through the tire 11.

From the foregoing disclosure of two embodiments of the invention, the metal form of FIGS. 2 and 3 and the plastic form of FIGS. 4 and 5, it is apparent that the objects and advantages of the invention may be attained through minor variations and substitution of equivalent components. Therefore, it is proper that the scope of the invention be measured solely by the appended claims.

What is claimed is:

1. A display appliance for a tire, said tire having a crowned tread, sidewalls, bead heel and toe portions, said appliance including a yoke member having lateral length sufficient to spread the tire beads, characterized in that at each end of the yoke member are leg members, each of said leg members is in the form of a tire bead receiving chuck having a radially outwardly directed face plate and an opposed radially outwardly directed jaw flange spaced axially outwardly of said face plate by a bridge link, said face plate and jaw flange each having axially opposed nubs, the leg member radially inward of the bight formed by said nubs being cove-shaped to approximate the cross-sectional profile of a usual tire bead, so that each of said leg members frictionally adheres to the inner heel portion of a tire bead, bridges the radially inner surface of a tire bead and frictionally adheres to the outer toe portion of a tire bead, the spreading of the beads by the yoke member and the engagement of the beads by the leg members flexing and distending the sidewalls and flattening the crowned tread thereby simulating inflation of the tire, at least one leg member having a re-entrant flange defining a clip notch for insertion and retention of a card for advertising the tire.

2. A display appliance according to claim 1, further characterized in that said re-entrant flange on a leg member is radially outward of the portion of the leg member frictionally adhering to the outer toe portion of a tire bead.

3. A display appliance according to claim 2, further characterized in that said re-entrant flange defining a clip notch is on the radially outer end of a leg member jaw flange.

References Cited

UNITED STATES PATENTS

| 1,762,227 | 6/1930 | Hebbeler | 81—15.3 |
| 1,771,401 | 7/1930 | De Franco | 81—15.3 |
| 1,864,234 | 6/1932 | Doering | 211—24 |
| 2,077,690 | 4/1937 | Harrison. | |
| 2,517,884 | 8/1950 | Kies. | |
| 2,737,743 | 3/1956 | Knapp. | |
| 2,874,829 | 2/1959 | Shaw. | |

EUGENE R. CAPOZIO, Primary Examiner.

RICHARD CARTER, Assistant Examiner.

U.S. Cl. X.R.

81—15.3; 254—50.1